United States Patent [19]

Tomiya et al.

[11] Patent Number: 5,772,750
[45] Date of Patent: Jun. 30, 1998

[54] PROCESS FOR PRODUCING β-FORM COPPER PHTHALOCYANINE PIGMENT

[75] Inventors: Nobuyuki Tomiya; Mikio Hayashi, both of Tokyo, Japan

[73] Assignee: Toyo Ink Manufacturing Co., Ltd., Tokyo, Japan

[21] Appl. No.: 840,928

[22] Filed: Apr. 25, 1997

[30] Foreign Application Priority Data

Apr. 26, 1996 [JP] Japan ................................... 8-107456

[51] Int. Cl.$^6$ .................................................. C09B 47/04
[52] U.S. Cl. ........................ 106/413; 106/410; 106/411; 106/412; 540/141
[58] Field of Search ................... 106/412, 413, 106/410, 411; 540/141

[56] References Cited

U.S. PATENT DOCUMENTS

| | | | |
|---|---|---|---|
| 2,402,167 | 6/1946 | Lang et al. | 106/412 |
| 2,486,351 | 10/1949 | Wiswall, Jr. | 106/412 |
| 2,556,726 | 6/1951 | Lane | 106/412 |
| 2,556,727 | 6/1951 | Lane | 106/412 |
| 2,556,728 | 6/1951 | Lane | 106/412 |
| 2,857,400 | 10/1958 | Cooper | 544/75 |
| 2,999,862 | 9/1961 | Geiger | 106/412 |
| 3,017,414 | 1/1962 | Minnich et al. | 106/412 |
| 3,775,149 | 11/1973 | Langley et al. | 106/412 |
| 4,104,276 | 8/1978 | Kranz et al. | 106/412 |
| 4,141,904 | 2/1979 | Cabut et al. | 106/412 |
| 4,853,039 | 8/1989 | Donegan et al. | 106/412 |
| 5,006,173 | 4/1991 | Fath et al. | 106/412 |
| 5,229,508 | 7/1993 | Ikegaya et al. | 106/412 |
| 5,281,268 | 1/1994 | Ide et al. | 106/412 |
| 5,296,033 | 3/1994 | Dietz et al. | 106/412 |
| 5,492,563 | 2/1996 | Urgan | 106/412 |

FOREIGN PATENT DOCUMENTS 2745893  4/1978  Germany ........................ 106/412

*Primary Examiner*—Anthony Green
*Attorney, Agent, or Firm*—Oblon, Spivak, McClelland, Maier & Neustadt, P.C.

[57] ABSTRACT

The present invention is a method for preparing a β-form copper phthalocyanine pigment comprising the steps of; dry milling crude copper phthalocyanine at a temperature between 110° and 200° C., and transforming an α-form crystal to a β-form crystal by treating the resulting α-β mixture of copper phthalocyanine in an organic solvent or a liquid mixture of water and an organic solvent. The preparation method of the present invention offers a β-form copper phthalocyanine pigment at lower cost having equivalent or superior quality in color strength, clearness, fluidity and hue compared to the pigment produced by the conventional salt milling method.

8 Claims, No Drawings

PROCESS FOR PRODUCING β-FORM COPPER PHTHALOCYANINE PIGMENT

BACKGROUND OF THE INVENTION

1. Field of the Invention

The present invention relates to a process for preparing β-form copper phthalocyanine pigment in which crude copper phthalocyanine is treated with an organic solvent after dry milling. More specifically, the present invention relates to a process for preparing a greenish β-form copper phthalocyanine pigment in which the aspect ratio of the primary pigment particle is between 1 and 3.

2. Description of the Prior Art

Copper phthalocyanine as synthesized is referred to as crude copper phthalocyanine and is not suitable as a pigment for printing ink since it consists of large β-form crystal particles having a particle size of approximately 10 to 200 $\mu$m. The process to reduce the size of this crude copper phthalocyanine to a size (approximately from 0.02 to 0.1 $\mu$m) suitable for printing ink is called pigmentation. Printing ink is obtained using pigmentized copper phthalocyanine.

There are various methods for pigmentation. The most common method is salt milling which uses a solvent (hereinafter referred to as a solvent salt milling method). This method is one in which a milling agent such as sodium chloride and an organic solvent which promotes crystal transition to the β-form are added to crude copper phthalocyanine and the resulting mixture is subjected to the milling process. The β-form copper phthalocyanine pigment produced by this method is suitable for printing ink and is widely used since the aspect ratio of the pigment particle is from 1 to 2 and it has clear greenish appearance with strong color strength. However, this method requires an amount of milling agent several times that of the pigment and also consumes considerable time, labor and energy in recovering the milling agent and organic solvent.

An alternative method is known in which crude copper phthalocyanine is dry milled and then treated with an organic solvent. This latter process is simpler than the solvent salt milling method described earlier, and is a highly effective method for providing β-form copper phthalocyanine pigment at low cost.

The crystal structure of β-form copper phthalocyanine makes a transition to an α-form crystal due to the force of impact applied during a dry milling process. Thus, the fraction of the α-form crystal in a ground material increases as one improves the milling efficiency and/or extending the milling time. When crude β-form copper phthalocyanine is ground by conventional dry milling down to a sufficiently small size suitable for coloring material, it has been known that the fraction of the β-form crystal in the ground material exceeds 60% as disclosed in Japanese Patent Application Laid-Open No. H7-310024.

On the other hand, when crude β-form copper phthalocyanine is lightly ground, the fraction of the α-form crystal can naturally be held at a lower level. Japanese Patent Application Laid-Open No. H2-294365 discloses that the fraction of the α-form crystal in the ground material is 21%. However, this milling method does not yield the finer particle size of pigment particles attained by the solvent salt milling method.

It is possible to further treat the ground material with an organic solvent to induce transition from the α-form crystal in the resulting ground material to β-form. However, it is known that this last step promotes acicular growth of pigment particles and that the resulting phthalocyanine pigment has a larger aspect ratio of the pigment particles compared to that obtained by the solvent salt milling method. This is probably due to the pigment crystal growth during the α to β transition which takes place while the α-form phthalocyanine particles are partially dissolved in an organic solvent used for the treatment.

To summarize, the method wherein crude copper phthalocyanine is dry-milled prior to treatment with an organic solvent has an advantage over the solvent salt milling method in that the recovery of milling agent is not necessary and, moreover, dry milling is an effective grinding method for providing cost-effective supply of β-form copper phthalocyanine. A disadvantage, however, is that a part of the β-form crystal transforms to α form by the mechanical stress applied to the pigment particles during the milling process. It is possible to counteract this form transition by subsequent solvent treatment in which an organic solvent reverses the transition and restores the β form. The resulting pigment particles, however, have large aspect ratio as a consequence of acicular growth of pigment particles during the solvent treatment. The coloring material of the end product tends to assume reddish hue and exhibit undesirable level of fluidity. To inhibit the formation of the α-form crystal, one can resort to the method of milling crude copper phthalocyanine in the presence of an organic solvent. There are, however, a number of difficulties associated with this approach, one of which is that choice of a solvent mandates a corresponding specific apparatus.

SUMMARY OF THE INVENTION

The object of the present invention is to provide a β-form copper phthalocyanine pigment with superior color strength, clearness, and fluidity and hue as a coloring material by a pigmentation method that is simpler than the conventional solvent salt milling method.

The present invention is a method for preparing a β-form copper phthalocyanine pigment, which method comprising the steps of; dry-milling crude copper phthalocyanine at a temperature between 110° and 200° C., and treating the resulting α-β mixed form crystal of copper phthalocyanine in an organic solvent or in a mixture of an organic solvent and water, thereby inducing transition of α- to β-form.

The present inventors have noticed that, for pigmentation by dry milling, the aspect ratio of the pigment particle of the final product is inevitably determined by the ratio of α to β in the mixed-form phthalocyanine crystal obtained by the dry-milling process. Consequently, to effectively achieve low aspect ratio of the end product particles, one must attain sufficiently small pigment particle size by the dry milling process and simultaneously reduce the fraction of the α-form crystal in the ground material to as low a value as possible.

According to the present invention, it is possible to mill the pigment particle to an average particle size of less than 0.1 $\mu$m and to reduce the fraction of the α-form crystal in the ground material after milling to less than 40% by weight by dry-milling crude copper phthalocyanine at an elevated temperature between 110° and 200° C. Furthermore, through treatment with an organic solvent it is possible to obtain β-form copper phthalocyanine pigment in which the aspect ratio of the primary pigment particles is in the range of 1 to 3 and the fraction of the α-form crystal is less than 1 wt %.

According to the present invention, it is possible to prepare a greenish β-form copper phthalocyanine pigment having a low aspect ratio of the pigment particles, while simplifying the pigmentation process. The present invention thus offers a β-form copper phthalocyanine pigment at lower cost having equivalent or superior quality in color strength, clearness, fluidity and hue compared to the pigment produced by the conventional solvent salt milling method.

DESCRIPTION OF THE PREFERRED EMBODIMENT

Dry milling of the present invention involves grinding crude copper phthalocyanine with a grinder in which a grinding medium such as beads or the like is employed without the substantial presence of liquids.

Grinding is accomplished by the grinding force or destructive force generated by collision between grinding media. Dry milling can be performed by a conventional apparatus such as a dry attritor, ball mill, vibration mill and the like which can be heated by vapor, oil or the like. Dry milling may be conducted in a deoxygenated atmosphere as needed by flushing the interior of the grinding apparatus by nitrogen gas flow or by allied methods. The appropriate milling time depends on the milling apparatus and the desired particle size.

Conventional dry milling of pigment particles is typically carried out under simultaneous cooling to 80°~100° C. since grinding generates heat. In the present invention, however, the internal temperature is maintained between 110° C. and 200° C., preferably between 130° C. and 180° C. resulting in the reduction of the fraction of α-form crystals in the ground product. Temperatures exceeding 200° C. are not preferred since the quality of the pigment is adversely affected.

It is preferable to reduce the fraction of the α-form crystal in the ground material to less than 40 wt %. This is to prevent the increase in the aspect ratio of the final pigment particle as a result of organic solvent treatment introduced to promote crystallographic transition from α form to β form.

The solvent treatment of the resulting ground material takes place in an organic solvent by itself or in a mixture of an organic solvent and water. In using the mixture, no additional modification of the mixture is recommended when the solvent has high affinity with water, while the mixture should be emulsified using a surfactant when the solvent has little or no affinity with water.

Solvent selection is made on the basis of its ability to transform an α-form crystal to a β-form. Examples of such solvents include aromatic compounds such as toluene, xylene, chlorobenzene, and nitrobenzene, aliphatic hydrocarbon compounds such as mineral spirit, kerosine, and ligroin, alcohol compounds such as isopropanol, butanol, isobutanol, ethyl cellosolve, butyl cellosolve, and cyclohexanol, ester compounds such as ethyl acetate, butyl acetate, and butyl cellosolve acetate, and ketone compounds such as acetone, and methyl ethyl ketone and the mixtures of two or more of the above.

The pigment of the present invention may be subjected to processing with resin to endow a pigment with properties suitable for specific applications. A resin may be added during dry milling or during solvent treatment. Examples of the resin suitable for printing ink include rosin group represented by a polymerized rosin, hydrogenated rosin, and disproportionated rosin, and rosin modified phenolics and the like.

The aspect ratio of the primary pigment particle prepared according to the present invention lies in the range of 1 to 3 which is approximately the same as that of the primary pigment particle obtained by the solvent salt milling method, and the hue of the product is greenish blue. When the pigment obtained by the method of the present invention is compared with the pigment obtained by the conventional solvent salt milling method, it was confirmed that it has equivalent or superior qualities in color strength, gloss, and fluidity.

EXAMPLE

Practical details of the present invention will be described in terms of Examples and Comparative Examples below:

A standard pigment used in Examples is a β-form copper phthalocyanine pigment obtained by pigmentation of crude copper phthalocyanine by the solvent salt milling method (5 parts of sodium chloride to one part of the source material), and the aspect ratio of the pigment particle is about 2.0. A transmission electron microscope was used to measure the aspect ratio of primary particles, and an X-ray diffractometer was used to determine the crystal structure.

Example 1

Crude copper phthalocyanine was milled for 1 hour at 160° C. in a dry attritor to obtain a ground material containing 8 wt % of the α-form crystal.

Twenty parts by weight of the ground material thus obtained was added to 100 parts by weight of water and 60 parts by weight of isobutanol. They were gently stirred for 1 hour under azeotropic condition and isobutanol was then removed by distillation. 8 parts by weight of hydrochloric acid (35 wt %) was added to the remainder for acid purification. The product was then filtered and dried.

Pigment particles thus obtained had an aspect ratio of 1.2, and the fraction of the β-form crystal was less than 1 wt %. When this pigment was compared with the conventional standard pigment containing the same pigment fraction, the ink comprising the pigment of the instant example had the same quality as the ink comprising the conventional pigment in color strength and gloss, and the ink of the instant example had a greenish hue.

Example 2

Crude copper phthalocyanine was milled for 1 hour at 130° C. in a dry attritor to obtain a ground material containing 35 wt % of the α-form crystal.

Twenty parts by weight of the ground material thus obtained was added to 60 parts by weight of water, 12 parts by weight of butyl acetate and 1 part by weight of PELEX OTP (nonionic surfactant, Kao Corp.), they were gently stirred for 1 hour under azeotropic condition and butyl acetate was then removed by distillation. 8 parts by weight of hydrochloric acid (35 wt %) was added to the remainder for acid purification. The product was then filtered and dried.

Pigment particles thus obtained had an aspect ratio of 2.0, and the fraction of the α-form crystal was less than 1 wt %. When this pigment was compared with the standard pigment containing the same pigment fraction, the ink comprising the pigment of the instant example had the same quality as those of the ink comprising the standard pigment in color strength, gloss and hue.

Comparative Example 1

Crude copper phthalocyanine was milled for 1 hour at 70° C. in a dry attritor to obtain a ground material containing 70 wt % of α-form crystal.

Twenty parts by weight of the ground material thus obtained was added to 100 parts by weight of water and 60 parts by weight of isobutanol. They were gently stirred for 1 hour under azeotropic condition and isobutanol was then removed by distillation. 8 parts by weight of hydrochloric acid (35 wt %) was added to the remainder for acid purification. The product was then filtered and dried.

Pigment particle thus obtained had an aspect ratio of 6.0, and the fraction of the α-form crystal was less than 1 wt %. When this pigment was compared with the conventional standard pigment containing the same pigment fraction, the ink comprising the pigment of the instant example exhibited poor fluidity and its hue was reddish.

Comparative Example 2

Crude copper phthalocyanine was milled for 30 minutes at 100° C. in a dry attritor to obtain a ground material containing 27 wt % of the α-form crystal.

Twenty parts by weight of the ground material thus obtained was added to 100 parts by weight of water and 60 parts by weight of isobutanol. They were gently stirred for 1 hour under azeotropic condition and isobutanol was then removed by distillation. 8 parts by weight of hydrochloric acid (35 wt %) was added to the remainder for acid purification. The product was then filtered and dried.

Pigment particles thus obtained had an α-form crystal fraction of less than 1 wt %. When this pigment was compared with the standard pigment containing the same pigment fraction, the ink comprising the pigment of the instant example, lacking sufficient milling, was inferior to the ink comprising the standard pigment obtained by the solvent salt milling method in color strength and clearness.

What is claimed is:

1. A method for producing a β-form copper phthalocyanine pigment comprising the steps of: dry milling crude copper phthalocyanine at a temperature between 110 and 200° C. to form a mixture of α-form crystal and β-form crystal copper phthalocyanine particles, and transforming the α-form crystal to the β-form crystal by treating said mixture in an organic solvent or in a liquid mixture of water and an organic solvent, the organic solvent being capable of transforming α-form crystal to β-form, to form copper phthalocyanine pigment, wherein primary particles of said copper phthalocyanine pigment have an aspect ratio in the range of 1 to 3, and wherein the α-form is present in said primary particles in an amount of less than 1 wt. %.

2. The method according to claim 1, wherein the temperature during said dry milling step is between 130°and 180° C.

3. The method according to claim 1, wherein the α-form crystal is present in the mixture obtained in said dry milling step in an amount less than 40 wt. % of the copper phthalocyanine particles.

4. The method according to claim 1, wherein said liquid mixture is an emulsion obtained by further adding a surfactant to a mixture of water and an organic solvent.

5. The method according to claim 1, wherein said organic solvent is selected from the group consisting of toluene, xylene, chlorobenzene, nitrobenzene, mineral spirit, kerosine, ligroin, isopropanol, butanol, isobutanol, ethyl cellosolve, butyl cellosolve, cyclohexanol, ethyl acetate, butyl acetate, butyl cellosolve acetate, acetone, methyl ethyl ketone and mixtures thereof.

6. The method according to claim 5, wherein said organic solvent is isobutanol or butyl acetate.

7. The method according to claim 1, wherein the particles formed after the dry milling step have an average particle size of less than 0.1 μm.

8. The method according to claim 1, wherein the transforming is carried out by adding the mixture obtained in said dry milling step to the organic solvent and water and stirring the mixture thereof under an azeotropic condition.

* * * * *